United States Patent [19]

Mazouz et al.

[11] Patent Number: 5,175,692

[45] Date of Patent: Dec. 29, 1992

[54] METHOD AND APPARATUS FOR PALLETIZING RANDOMLY ARRIVING MIXED SIZE AND CONTENT PARCELS

[75] Inventors: Abdel-Kadar Mazouz, Boca Raton, Fla.; Gale D. Slutzky, Cincinnati, Ohio; Ernest L. Hall, Cincinnati, Ohio; Richard L. Shell, Cincinnati, Ohio; Ronald L. Huston, Cincinnati, Ohio

[73] Assignee: University of Cincinnati, Cincinnati, Ohio

[21] Appl. No.: 707,261

[22] Filed: May 24, 1991

Related U.S. Application Data

[63] Continuation of Ser. No. 561299, Aug. 1, 1990, abandoned, which is a continuation-in-part of Ser. No. 237297, Aug. 26, 1988, abandoned.

[51] Int. Cl.⁵ .................................................. G06F 15/20
[52] U.S. Cl. .................................... 364/478; 364/471; 901/7; 414/900; 414/902
[58] Field of Search ............... 364/478, 468, 469, 471, 364/131, 148; 901/45, 7; 414/900, 901, 902, 788, 799

[56] References Cited

U.S. PATENT DOCUMENTS

| | | | |
|---|---|---|---|
| 3,586,176 | 6/1971 | Rackman et al. | 214/6 |
| 3,863,776 | 2/1975 | Harman | 414/799 |
| 3,884,363 | 5/1975 | Ajlouny | 214/1 BB |
| 3,941,048 | 3/1976 | Oe et al. | 100/215 |
| 3,983,373 | 9/1976 | Russell | 364/478 |
| 4,015,723 | 4/1977 | Beaty, Jr. et al. | 214/6 P |
| 4,154,347 | 5/1979 | Vander Meer | 414/791.7 |
| 4,197,046 | 4/1980 | Shank | 414/799 |
| 4,218,616 | 8/1980 | Loomer | 250/223 R |
| 4,242,025 | 12/1980 | Thibault | 414/70 |
| 4,273,506 | 6/1981 | Thomson | 414/735 |
| 4,287,459 | 9/1981 | Dahlstrom | 318/568 |
| 4,343,484 | 8/1982 | Hudgins | 414/212 |
| 4,354,786 | 10/1982 | Spitler | 414/790.3 |
| 4,512,701 | 4/1985 | Foust et al. | 414/799 |
| 4,597,707 | 7/1986 | Cornacchia | 414/6 Z |
| 4,628,497 | 12/1986 | Bierhoff | 369/44.32 |
| 4,632,633 | 12/1986 | Avey | 414/787 |
| 4,641,271 | 2/1987 | Konishi et al. | 364/478 |
| 4,674,948 | 6/1987 | Hornacek | 414/744.8 |
| 4,692,876 | 9/1987 | Tenma et al. | 364/513 |
| 4,708,578 | 11/1987 | Richter | 414/720 |

OTHER PUBLICATIONS

Hahn, S. G. "On the Optimal Cutting of Defective Sheets," Operations Research, 16, No. 6 (Nov.-Dec. 1968), 1100-1115.

Christofides, N. and C. Whitlock, "An Algorithm for Two-Dimensional Cutting Problems," Operations Research, 25, No. 1 (Jan.-Feb. 1977), 30-44.

Salzer, J. J. "Order Selection to Conveyors with Voice Encoding on Advanced Distribution Warehouse Incorporating a High Degree of Mechanization and Automation," 2nd International Conference on Automation in Warehousing University, of Keele, England, Mar. 22nd-25th, 1977.

Kulick, A., "Interlocking Pallet Pattern Simulation Program," Industrial Engineering, 14, No. 9 (Sep. 1982), 22-24.

Hall, E. L. and Hal, B. C., Robotics, A User's Friendly Introduction, CBS College Publishing, 1985.

George, J. A. and D. F. Robinson, "A Heuristic for Packing Boxes into a Container," Computers and Operations Research, 7, No. 3 (1980), 147-156.

Hodgson, Thom J., "A Combined Approach to the Pallet Loading Problem," IIE Transactions (Institute of Industrial Engineers), vol. 14, No. 3, pp. 175-182, Sep. 1982.

Tsai, R. and Malstrom, E., "Robotics Unitization of Warehouse Pallet Loads," International Industrial Engineering Conference Proceedings, Chicago, Ill., pp. 222-227, 1985.

Tsai, D. R., "Robot Manipulator Application on Warehouses: Palletization with Mixed Box Types", M. S. Thesis, Department of Industrial Engineering, Ames, Iowa, 1984.

F. M. I., Material Handling Video on Palletizing, Dec., 1986.

Matson, J. O. and White, J. A., "Operation Research and Material Handling," European Journal of Operational Research, vol. 11, No. 4, pp. 309-318, Dec. 1982.

Hinxman, A. I., "The Trim-Loss and Assortment Problems: A survey," *European Journal of Operational Research*, 5, No. 1 (Jul. 1980), 8–18.

Herz, J. C. "Recursive Computational Procedure for Two-Dimensional Stock Cutting," IBM Journal of Research and Development, 16, No. 5 (Sep. 1972), 462–469.

Albano, A. and R. Orsini, "A Heuristic Solution of the Rectangular Cutting-Stock Problem," The Computer Journal, 23, No. 4 (Nov. 1980), 338–343.

Adamowicz, M. and A. Albano, "A Two-Stage Solution of the Cutting-Stock Problem," In Information Processing 71, New York: North-Holland Publishing Company, 1972.

Adamowicz, M. and A. Albano, "A Solution of the Rectangular Cutting-Stock Problem," IEEE Transactions on Systems, Man, and Cybernetics, SMC-6, No. 4 (Apr. 1976), 302–310.

Albano, A. and G. Sapuppo, "Optimal Allocation of Two-Dimensional Irregular Shapes Using Heuristic Search Methods," IEEE Transactions on Systems, Man, and Cybernetics, SMC-10, No. 5 (May 1980), 242–248.

Cheng, M. H. R. and A. W. Pila, "Maximized Utilization of Surface Areas with Defects by the Dynamic Programming Approach," ISA Transactions, 17, No. 4 (1978), 61–69.

Page, E., "A Note on a Two-Dimensional Dynamic Programming Problem," Operational Research Quarterly, 26, No. 2 (1975), 321–324.

Steudel, H. J. "The Right Pallet Cuts Costs," Industrial Engineering, 8, No. 2 (Feb. 1977), 14–18.

Tanchoco, J. M. A. and M. H. Agee, "Plan Unit Loads to Interact with all Components of Warehouse System," Industrial Engineering, 13, No. 6 (Jun. 1981), 36–47.

Steudel, H. J., "Generating Pallet Loading Patterns: A Special Case of the Two-Dimensional Cutting-Stock Problem," Management Science, 25, No. 10 (Oct. 1977), 997–1004.

Larsen, O. and G. Mikkelsen, "An Interactive System for the Loading of Cargo Aircraft," *European Journal of Operational Research*, vol. 4, 367–373, 1980.

Anon, "Palletizing and Unitizing: How Robots Stack Up," *Modern Material Handling*, vol. 39, No. 12, pp. 59–62, Sep. 1984.

Puls, Fred M. and Tanchoco, J. M. A., "Robotic Implementation of Pallet Loading Patterns," *International Journal of Production Research*, vol. 24, No. 3, pp. 635–645, 1986.

Villeneuve L. et al.,"Analysis of a Robotized Palletization Workstation Using Iconic-Digital Simulation," *International Industrial Engineering Conference Proceedings*, Dallas, pp. 107–112, May 1986.

*Material Handling Engineering*, "General Electric Installs Robotic Palletizer," Jun. 1986.

Anon., "Robots Picks, Counts, and Palletizes Parts," *Modern Materials Handling*, vol. 39, No. 10, pp. 64–65, Jul. 6, 1984.

Anon, "Pallets: New 'Container' Sizes Not Needed?" *Cargo Systems International: The Journal of ICHCA*, vol. 1, No. 1, pp. 44–45, Nov. 1973.

"Artificial Intelligence is Here," *Business Week*, Jul. 9, 1984, pp. 54–62.

Bischoff, E. and Dowlsand, W. B." An Application of the Micro to Product Design and Distribution," *Journal of the Operational Research Society*, vol. 33, No. 3, pp. 271–280, 1982.

Burge, W. H. "Combinatory Programming and Combinatorial Analysis," IBM Journal Research, Sep. 1972.

Carlo, et al., "Micro-IPLS: Pallet Loading on a Microcomputer," Computers and Industrial Engineering, vol 9, No. 1, pp. 29–34, 1985.

Cotter, S. M., "Visual Monitoring of Palletizing and Packaging," *International Conference on Robot Vision and Sensory Controls, Third Proceedings*, pp. 186–195, Nov. 7–10, 1983.

Elsayed, E. R. and Dube, R. et al., "Heuristic Algorithms for Handling Orders Within a Warehouse," date unknown.

Mechanical Handling of United Loads and Large Shipping Cases and Crates, date unknown.

Fahlman, Scott Elliott, "A Planning System for Robot Construction Tasks," Artifical Intellegience Journal, vol. 5, No. 1, Spring 1974.

Gilmore, P. C. and Gomory R. E., "Multistage Cutting Stock Problems of Two and More Dimensions," *Operations Research*, vol. 13, pp. 94–120, 1965.

Hayes-Roth, Barbara, "A Blackboard Architecture for Control," Artificial Intelligence Journal, vol. 26, No. 3, pp. 251–321, Jul. 1985.

Warnecke, H. J. "Loading and Unloading of Pallets Using Sensor-Assisted Industrial Robots," *Symposium* on *Information Control Problems in Manufacturing Technology, Fourth Proceedings.* pp. 63-70, Oct. 26-28, 1982.

Seger, Bengt, et al., "Application of an Industrial Robot for Palletizing of Boxes in a Complicated Pattern," *International Symposium on Industrial Robots, Fourth, Proc. Tokyo, Japan,* Published by Japan Industrial Robot Association, pp. 465-474, No. 19-21, 1974.

Hoffman, D. G., "Packing Problems and Inequalities," In *The Mathematical Gardner,* ed. D. A. Klarner, Belmont, Calif.: Wadsworth International, 1981.

Hilbert, D., Pariser Vortrag. Mathematische Problem, Problem 18; Nachr. Gesellsch. Wiss. Gottingen, Mathem.-Physik., Klasse, 1900 date unknown.

Chung, F. R. K., M. R. Garey and D. S. Johnson, "On Packing Two-Dimension Bins," SIAM Journal on Albebraic and Discrete Methods, 3, No. 1 (Mar. 1982), 66-76.

Baker, B. S., E. G. Coffman and R. L. Rivest, "Orthogonal Packings in Two Dimensions," SIAM Journal of Computer, 9, No. 4 (Nov. 1980), 846-855.

Brown, D. J., "An Improved BL Lower Bound," Information Processing Letters, 11, No. 1 (Aug. 1980), 37-39.

Gupta, A. D., "Operations Research Models for Design of Palletization System," Journal of Institution of Engineers (India), Mechanical Engineering Division, 57, pt. ME 4 (Jan. 1977), 183-185.

Carpenter, H. and Dowsland W., "Practical Considerations of the Pallet-Loading Problem," *Journal of Operation Research Society,* vol. 36, No. 6, pp. 449-497, 1985.

Seger, Bengt, "Box Palletizing Carried out by Means of an Industrial Robot with Sophisticated Control System," *International Symposium on Industrial Robots, Fifth Proceedings,* pp. 557-564, Sep. 22-24, 1975.

Birk, J. R. and Kelly, R. B., "New Robot Programming Devices for Teaching Assembly, Inspection, Materials Handling, and Palletizing Tasks," *Third Conference on Industrial Robots,* University of Nottingham, U. K., Paper 84, Mar. 24-26, 1976.

Barret, F. D., A Former MIT Professor Urges Food Wholesealers into Robotics, *Automation News,* p. 8, Apr. 9, 1984.

Dotshew, Daniel Antonov et al., "Method for the User-Oriented Solution of Palletizing Problems for Industrial Robots," *MSR Steuern Reoeln,* vol. 28, No. 4, pp. 169-173, Apr. 1985.

Greenberg, Harold and Hegerich, Robert L., "A Branch Search Algorithm for the Knapsack Problem," Management Science, vol. 16, No. 5, Jan. 1970.

Kay, J. "Robot Palletizer: Factors Affecting Accuracy of Bag Placing," *British Robot Association, Fourth Annual Conference Proceedings,* pp. 143-145, May 18-21, 1981.

Korchemkin, J. B., "Heuristics Partitioning Algorithm for a Packaging Problem," Computing (Vienna/New York) vol. 31, No. 3, pp. 203-209, 1983.

A. K. Mazouz, E. L. Hall and R. L. Shell, "Expert System for Flexible Mechanism for Material Flow", Oct. 8, 1987.

A. K. Mazouz, R. L. Shell and E. L. Hall, "Expert System for Control of Flexible Palletizing Cell for Mixed Size and Weight Parcels", Center for Robotics Technical Report, No. 112, Nov. 1, 1987.

Mazouz, Abdel-Kader et al., "Flexible Palletizing Cell for Mixed Size and Weight Parcels", International Industrial Engineering Conference, Washington, D.C., May 17-20, 1987.

Prepared by Cincinnati Center for Robotics Research, Department of Mechanical and Industrial Engineering, University of Cincinnati, "Research Proposal for Development and Demonstration of Robotic Palletizing of Mixed Size and Weight Containers", Date-Prior to Mar. 24, 1986.

"University of Cincinnati Recommendation for Administrative Action", Mar. 24, 1986.

Author unknown, "A Multi-Client Proposal for Flexible Intelligent Palletizing of Mixed Size Parcels", Jun. 16, 1986.

Prepared by Cincinnati Center for Robotics Research, Department of Mechanical and Industrial Engineering, University of Cincinnati, "Final Report-Development and Demonstration of Robotic Palletizing of Mixed Size and Weight Containers", Jun. 24, 1987.

Ernest L. Hall, "Development and Demonstration of Robotic Palletizing of Mixed Size and Weight Containers", Feb. 8, 1985.

Prepared by the University of Cincinnati, Department of Mechanical and Industrial Engineering, "Robotic Application for Mixed Size/Weight Case Palletizing", Jan., 1983.

A-Kader Mazouz et al., "Expert System for Flexible Palletizing of Mixed Size and Weight Parcels", Proc. of Intelligent Robots and Computer Vision Conf., SPIE vol. 852, Cambridge, Mass., Nov. 1, 1987.

*Primary Examiner*—Joseph Ruggiero
*Assistant Examiner*—Paul Gordon
*Attorney, Agent, or Firm*—Frost & Jacobs

[57] ABSTRACT

A method and apparatus are described for automatically palletizing parcels of various sizes, shapes and contents which arrive in random order at a pickup point to be transferred onto a pallet. A system is disclosed including a digital computer operating under an expert computer program which takes information about attribute factors of the parcels and applies predetermined rules to assign a space for the parcel on the pallet, and communicates coordinates of the assigned space to a flexible material handling robot.

26 Claims, 9 Drawing Sheets

| PARCEL TYPE | DIMENSIONS | REAL PARCEL SIZE | ESTIMATED PARCEL SIZE |
|---|---|---|---|
| SPAGHETTI | LENGTH = 15.8125/3<br>WIDTH = 12.375/3 | 5.27<br>4.125 | 6<br>5 |
| JELLY | LENGTH = 10.25/3<br>WIDTH = 8.00/3 | 3.416<br>2.67 | 4<br>3 |
| BEANS | LENGTH = 12.00/3<br>WIDTH = 9.00/3 | 4<br>3 | 4<br>3 |
| TEA | LENGTH = 13.25/3<br>WIDTH = 11.25/3 | 4.416<br>3.75 | 5<br>4 |

| PARCEL TYPE | DIMENSIONS | REAL PARCEL SIZE | ESTIMATED PARCEL SIZE |
|---|---|---|---|
| SPAGHETTI | LENGTH = 15.812/4<br>WIDTH = 12.375/4 | 3.95<br>3.10 | 4<br>4 |
| JELLY | LENGTH = 10.25/4<br>WIDTH = 8.00/4 | 2.56<br>2.00 | 3<br>2 |
| BEANS | LENGTH = 12.00/4<br>WIDTH = 9.00/4 | 3.00<br>2.25 | 3<br>3 |
| TEA | LENGTH = 13.25/4<br>WIDTH = 11.25/4 | 3.312<br>2.81 | 4<br>3 |

FIG. 4B

| PARCEL TYPE | COMPUTATIONS | ERROR×3 | TOTAL ERROR |
|---|---|---|---|
| SPAGHETTI | LENGTH 6−5.27=0.73<br>WIDTH 5−5.125=0.874<br>ERROR FOR ONE BOX<br>ERROR FOR ALL BOXES | 2.19<br>2.625<br><br>4.815×4 | <br><br>4.815<br>19.26 |
| JELLY | LENGTH 4−3.426=0.57<br>WIDTH 3−2.67=0.33<br>ERROR FOR ONE BOX<br>ERROR FOR ALL BOXES | 1.722<br>0.99<br><br>2.712×8 | <br><br>2.712<br>21.70 |
| BEANS | LENDTH 4−4=0.00<br>WIDTH 3−3=0.00<br>ERROR FOR ONE BOX<br>ERROR FOR ALL BOXES | 0.00<br>0.00<br><br>0.00×6 | <br><br>0.00<br>0.00 |
| TEA | LENGTH 5−4.42=0.583<br>WIDTH 4−3.75=0.25<br>ERROR FOR ONE BOX<br>ERROR FOR ALL BOXES | 1.75<br>0.75<br><br>2.50×6 | <br><br>2.50<br>15.00 |
| TOTAL ERROR | | | 55.9 |

FIG. 5A

| PARCEL TYPE | COMPUTATIONS | ERRORx4 | TOTAL ERROR |
|---|---|---|---|
| SPAGHETTI | LENGTH = 4−3.95 | 0.188 | |
| | WIDTH = 4−3.10 | 3.6 | |
| | ERROR FOR ONE BOX | | 3.788 |
| | ERROR FOR ALL BOXES | 3.788x4 | 15.15 |
| JELLY | LENGTH = 3−2.56 | 1.76 | |
| | WIDTH = 2−2.00 | 0.00 | |
| | ERROR FOR ONE BOX | | 1.76 |
| | ERROR FOR ALL BOXES | 1.76x8 | 14.08 |
| BEANS | LENGTH = 3−3.00 | 0.00 | |
| | WIDTH = 3−2.25 | 3.00 | |
| | ERROR FOR ONE BOX | | 3.00 |
| | ERROR FOR ALL BOXES | 3.00x6 | 18.00 |
| TEA | LENGTH = 4−3.312 | 2.75 | |
| | WIDTH = 3−2.812 | 0.75 | |
| | ERROR FOR ONE BOX | | 3.50 |
| | ERROR FOR ALL BOXES | 3.50x6 | 21.00 |
| TOTAL ERROR | | | 58.93 |

METHOD AND APPARATUS FOR PALLETIZING RANDOMLY ARRIVING MIXED SIZE AND CONTENT PARCELS

This is a continuation of application Ser. No. 07/561,299, filed Aug. 1, 1990, now abandoned, which is a continuation in part application of U.S. Ser. No. 07/237,297 filed Aug. 26, 1988, now abandoned.

This application incorporates by reference the computer program contained in the microfiche appendix appended hereto, consisting of 2 microfiche having 125 frames.

TECHNICAL FIELD

The present invention relates generally to automated palletizing systems, and is particularly directed to flexible machine stacking, semi automated material handling and palletizing containers of various shapes, sizes, weights, and contents with the use of robots and computers. The invention will be specifically disclosed in connection with a computer system which controls the stacking of randomly arriving parcels onto a pallet by applying rules contained in the computer memory.

BACKGROUND OF THE INVENTION

In many industries involving the distribution of parcels to other locations, the parcels are stacked on top of a skid to form what is called a pallet. Usually, all of the parcels stacked on a particular pallet are to be delivered to one location. These parcels frequently vary in size, shape, and contents. Such parcels usually arrive randomly to the area where they are placed on the pallets. This usually results in a random stacking of such parcels until the pallet is either completely full or may not be stacked higher due to the stacking pattern. The pallets are usually then wrapped by a shrink wrap type plastic material to ensure some integrity of the pallet during the shipping process.

For years, humans have been used to stack parcels onto pallets. Stacking parcels that may weigh up to 65 pounds each for eight hours per shift is a back breaking and monotonous task. As the number of parcels stacked by a human in any one shift increases, the attention to proper stacking and safe palletizing diminishes. In several industries, such inattention results in substantial damage to the contents of the parcels. Furthermore, back injuries and related problems abound for people in such an occupation. In Sweden, for example, the number one injury is back injury due to palletizing.

Industry in general has taken some steps to address the problems of palletizing and injury. In order to stack a more consistent pallet, the "bang wall" technique is frequently applied. In a "bang wall" system, the pallet is placed adjacent to perpendicular walls so that the walls form a corner boundary for the pallet for placing the parcels as the height of the pallet increases. The theory with this system is that by physically confining one corner of the pallet, a reasonable pallet can be constructed every time.

In recent years, it has been recognized that industrial robots may be used to stack parcels onto pallets. However, these applications have typically been limited to palletizing parcels of the same size and weight. In other applications, parcels are stacked in a predetermined pattern as they arrive randomly at the pallet area.

An improved version of a robot stacking system is disclosed in U.S. Pat. No. 4,692,876 to Tenma et al. That patent discloses a system for taking randomly arriving parcels, warehousing them, and then conveying the parcels in a predetermined order to the pickup point to be loaded onto the pallet in predetermined positions. A system such as this requires additional capital investment in a system to automatically warehouse the parcels and then remove them in a particular order and convey them to a robot. It also requires additional time in order to warehouse and redistribute the parcels. While such a system may eliminate problems with human palletizing and injuries therefrom, it is not an economical solution.

SUMMARY OF THE INVENTION

Accordingly, it is an object of the present invention to provide a method for stacking randomly arriving articles of various configurations in an optimized pattern onto a pallet.

It is another object of the present invention to provide an expert computer system to determine the parcel placement locations for randomly arranging parcels.

Additional objects, advantages, and other novel features of the invention will be set forth in part in the description that follows and, in part, will become apparent to those skilled in the art upon examination of the following or may be learned with the practice of the invention. The objects and advantages of the invention may be realized and obtained by means of the instrumentalities in combinations particularly pointed out in the appended claims. To achieve the foregoing and other objects, and in accordance with the purposes of the present invention as described herein, a method is provided for using a computer system to palletized parcels. The system is initialized and data identifying the type and quantity of parcels to be palletized are imputed into a memory of the computer system. A logical volume element, known as a voxel, is determined, and the pallet space available is divided into logical voxels, thereby creating a pallet model. The pallet model is stored in a memory of the computer for reference while determining where to stack the parcels. A parcel to be stacked is identified, and attribute factors of the parcels are evaluated in comparison to the threshold levels of available space in the pallet model. The pallet model is searched for available spaces in which to stack the parcel, and space is assigned to such a parcel when space is found. The location of the assigned space is communicated to the means for stacking the parcels, and the parcel is stacked in the assigned space. The computer system is then updated and the procedure followed until all parcels have been stacked.

In accordance to a further aspect of the invention, the method includes identifying the set relationship that exists between the parcel types to be palletized.

In yet another aspect of the invention, the set relationship is identified by selecting a first and a second group of parcel types, and determining whether the second group can be stacked on top of the first group. The available quantity and acceptable orientation of the parcel types of the two groups are examined to determine if they can be combined to make matching flat surfaces.

In yet another aspect of the invention, parcel types are identified which are toxic, and space is reserved for such toxic parcels in the pallet model.

In a still further aspect of the invention, searching the pallet model for space includes determining whether the parcel to be stacked is part of a set which has a set space reserved in the pallet model and determining whether space within the reserved set space exists in the pallet model for the parcel to be stacked.

In still another aspect of the invention, the step of searching the pallet for space includes determining whether a set space can be reserved in the pallet model for a new set of which the parcel to be stacked is a part, and reserving such a set space.

In accordance with another aspect of the invention, mechanical element apparatuses and methods are included.

Still other objects of the present invention will become apparent to those skilled in this art from the following description wherein there is shown and described a preferred embodiment of this invention, simply by way of illustration of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrates several aspects of the present invention, and together with the descriptions served to explain the principles of the invention.

In the drawings:

FIG. 3 is a flow chart which shows the steps to set up the system.

FIGS. 4a and 4b are tables which shows sample voxel calculations.

FIGS. 5a and 4b are tables which shows sample voxel error calculations.

Reference will now be made in detail to the present preferred embodiment of the invention, an example of which is illustrated in the accompanying drawings.

DETAILED DESCRIPTION OF THE PREFERRED EMBODIMENT

Figure 1:
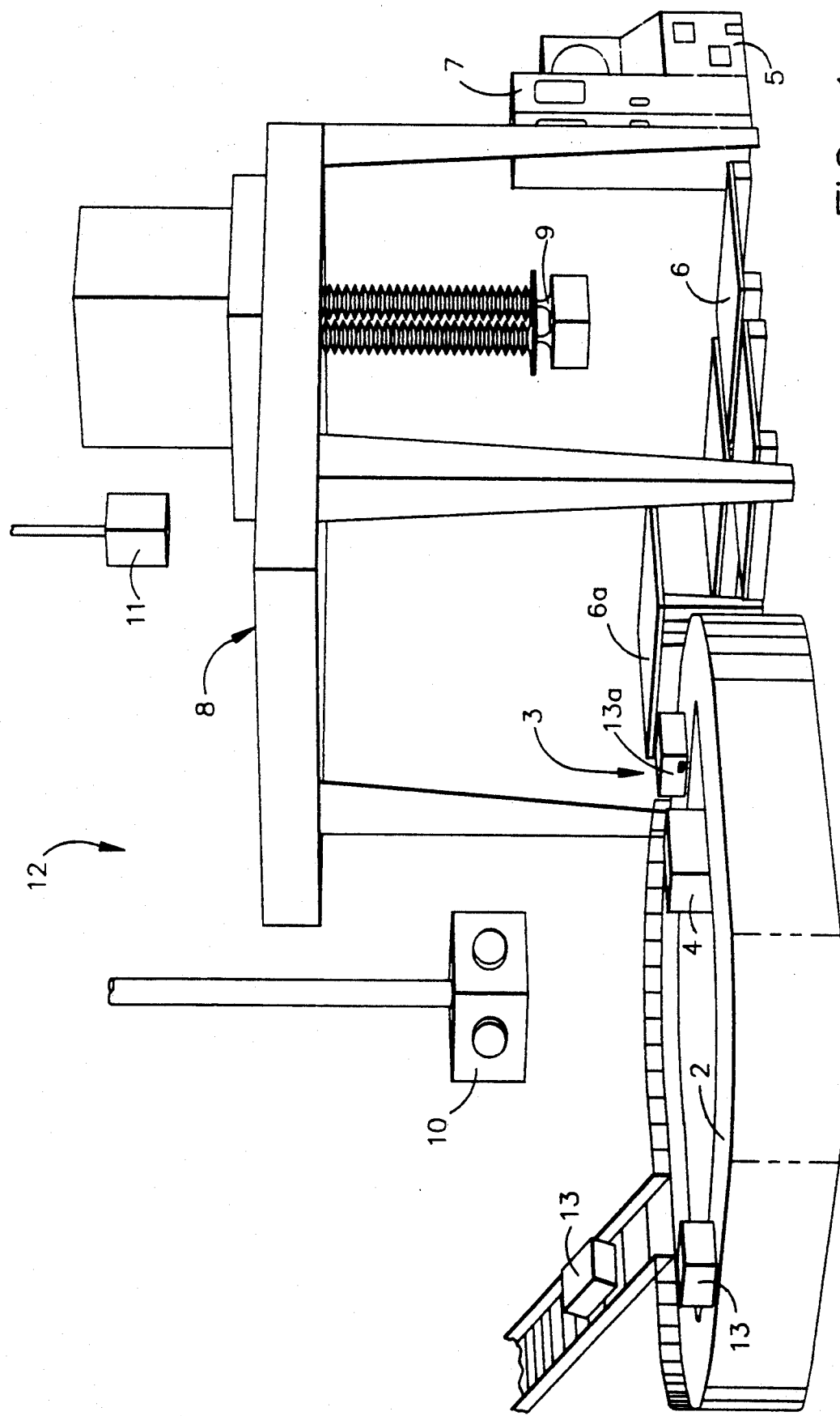
FIG. 1 is an elevational view showing the automated palletizing system.

Referring to FIG. 1, a representative setup of the physical hardware used to practice this invention is shown. Parcels 13 are transported in a random sequence by the conveyor system 1, which delivers the parcels 13 to the automated palletizing system 12. These parcels 13 are delivered onto the pickup conveyor system 2, shown as a carousel type conveyor which is driven by any conventional means. The parcels 13 are transported by the conveyor system 2 to a pickup area 3. A bar code reader 4 is located adjacent the carousel 2, which reads a UPC bar code located on the outside of the parcels 13. The information obtained by reading the bar code is conveyed to the computer system 5, which determines the type, i.e. size and contents of the parcel based on a stored program and data base. Computer system 5 applies rules and procedures, which are identified in the appendix containing the computer program, to information stored in its memory in order to determine a location for stacking the parcel. Once a location for the parcel to be stacked has been determined, the coordinates of the parcel 13a at the pickup point 3 and the coordinates of the location where the parcel 13a is to be stacked on pallet 6 or in the queue 6a is communicated to the robot controller 7. The robot controller 7 directs the robot system 8, here shown as a gantry type robot, to the pickup point 3. The parcel 13a is then lifted by a gripper system 9, shown as a vacuum gripper. A vacuum system consisting of the pumps, tubing, and cups necessary to permit moving the parcel 13a from pickup point 3 to a location on pallet 6 or in the queue 6a is also provided (not shown). After retrieving the parcel 13a, the robot system 8 moves the parcel 13a to the appropriate location, and releases the parcel from grippers 9. Alternatively, the location information generated by the computer system 5 could be displayed on a CRT screen, and used by a human to manually stack the parcel 13a in the indicated location.

Also shown are two vision systems 10 and 11. Vision system 10 may be used to monitor the location of parcels on conveyor system 2. Vision system 11 may be used to monitor the stacking process of parcels on pallets 6 or in the queue 6a. Such vision system can provide monitoring of the quality of operation of the system 12.

The decision where to stack a particular randomly arriving parcel is made based on steps and rules contained within the computer system. The computer system uses a heuristic solution approach to decide where to stack a particular parcel. A heuristic solution is judged to be acceptable if the solution is "good enough", where "good enough" can be defined by what an expert would say is "good enough", based on a set of rules which must be satisfied. This approach utilizes a complex set of rules and criteria rather than simple mathematical objective functions. This heuristic solution approach is in contrast to a system which attempts to find an optimum solution to stacking the parcels.

To provide the knowledge base and location commands for the robot to stack the parcels of different sizes, contents and weights, an expert system is used. An expert computer system is one which combines programmed intelligence and knowledge of experts who usually performed the activities now to be performed by the system. Such knowledge and expertise is obtained by observing human experts and transferring it to computable forms. Such forms are then programmed into an expert system to duplicate the intelligence of a human expert. This transfer of knowledge is an itterative process which may be updated based on the results obtained by the operation of the system.

In the preferred embodiment of the present invention, the knowledge based system consists of production rules and a working memory. The computer program, which is appended hereto and incorporated herein, is written in a commercially available language known as Franz LISP. The production rules and working memory are implemented in the inference engine of a commercially available program known as OPS5. As is well known in the computer programming field, the OPS5 program implements the production rules and working memory which are written in the form of program modules operating under LISP. The present invention can operate under any appropriate language and system which gives the desired performance.

Figure 2:
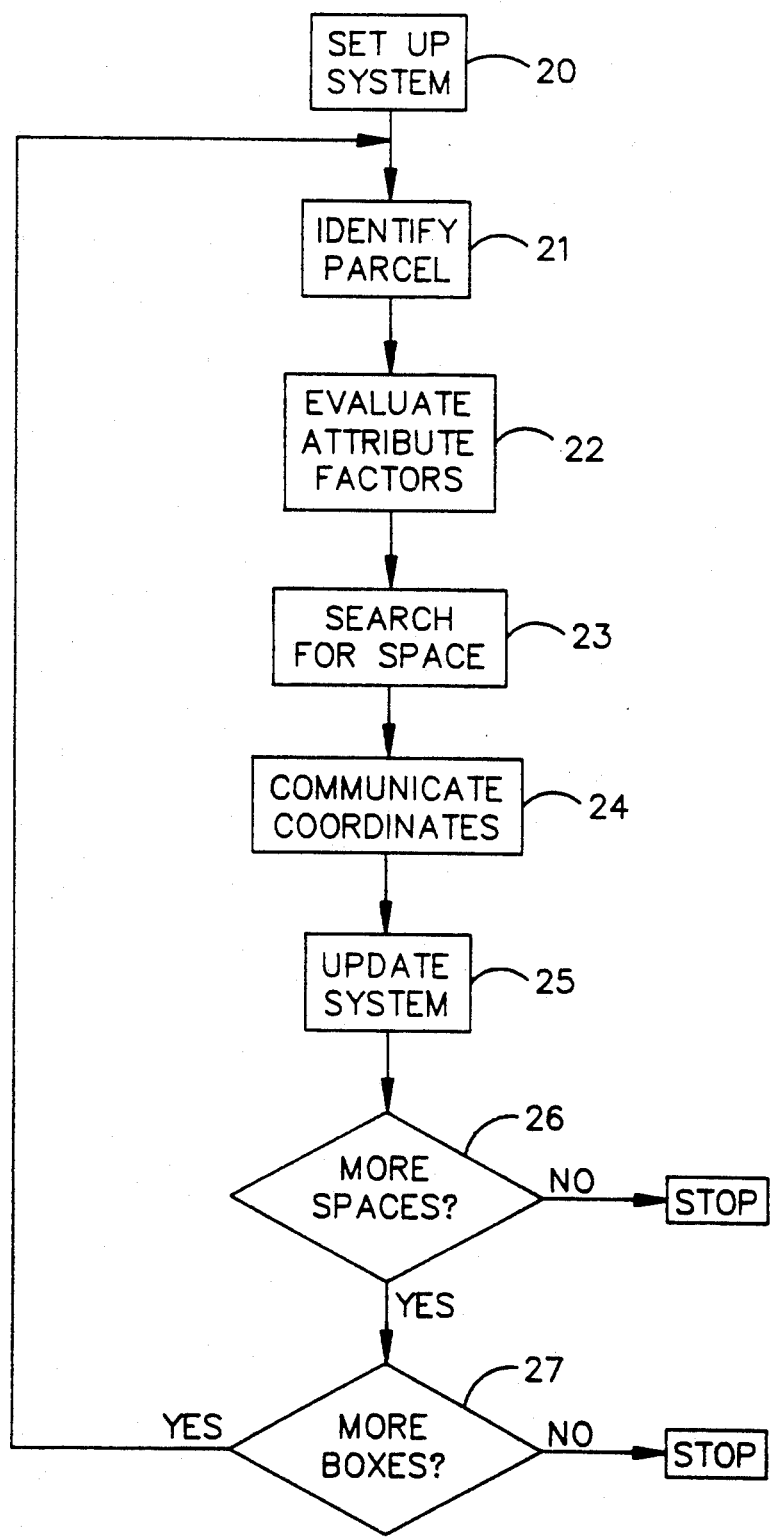
FIG. 2 is a flow chart which shows the general steps involved in practicing the present invention.

The actual operation and decision making process of the system is best understood by reference to FIG. 2, which shows a generalized flow chart of the steps involved in practicing the present invention. Prior to practicing the present invention, the automated palletizing system must be calibrated. This includes steps well known in the field, such as locating all of the components and teaching the robot system what are the limits of its operations. This may be considered as part of Step 20.

At set up system step 20, the computer system is initialized, and set up for the group of parcels to be palletized, based on steps which are detailed below. Once the system has been set up, the individual parcels of the group of parcels to be palletized are transported in a random sequence (i.e. the order of presentation at pickup point 3 does not have to be predetermined or know aprori)/to the pickup point 3 where they are individually identified at step 21. Based on information contained in the computer system memory, and based on the production rules, the attribute factors of the parcel 13a at pickup point 3 are evaluated at step 22 and a search for empty space in which to stack the parcel 13a is conducted at step 23. If space is identified in accordance to predetermined rules, the space is assigned to the parcel 13a. The coordinates of the assigned space and the coordinates of the parcel 13a to be stacked are communicated to the robot controller at step 24. The robot controller uses this information to direct the manipulation arm of the robot system 8 to transport the parcel 13a from the pickup point 3 to appropriate space on the pallet 6, or on the queue 6a. Commercial programs are available for configuring the robot 8 to receive such information and to transport the parcel 13 from one location to another.

At step 25, the computer system 5 is updated based on its evaluation of the parcel and subsequent stacking. At step 26, the system determines whether more space is available on the pallet, and at step 27 the system determines if more parcels are available to be stacked. If more space is available and more parcels are to be stacked, the system returns to step 21 and the procedure is repeated until no space is available or no parcels are left to be stacked.

Figures 3, 4A:
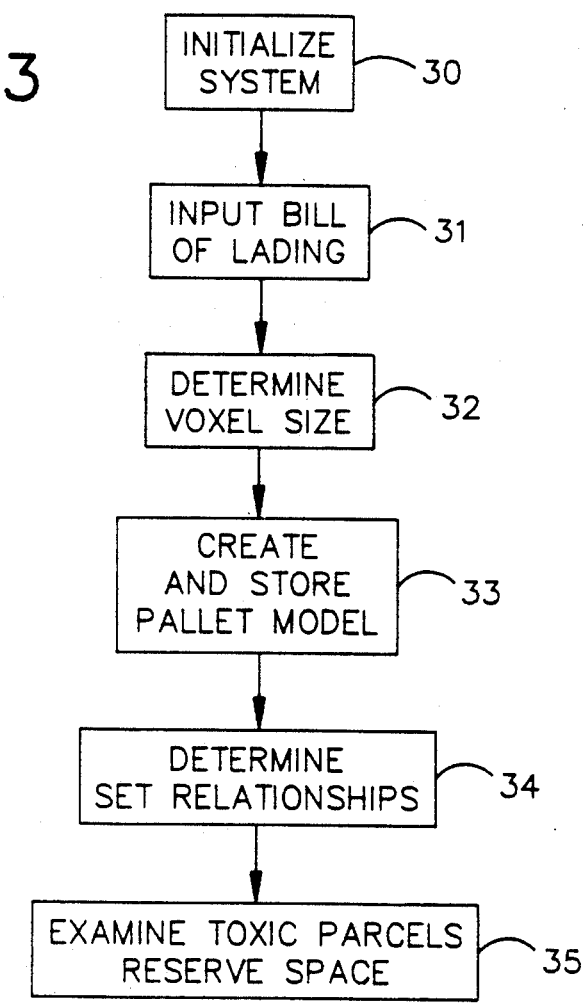

Set up system step 20 includes some activities which must be followed prior to examining each group of parcels to be palletized. Referring to FIG. 3, which details the activities which comprise setup system step 20, the system is first initialized at step 30. In order to palletized parcels, there must be a source of parcels available. Typically the source of parcels is a warehouse which contains a population of various types of parcels. When a pallet is to be constructed, parcels that are to be palletized are selected from the warehouse population. The group of parcels to be palletized represent a subset of the warehouse population.

At step 30,/the computer system is initialized, which includes information about the warehouse population being formed in a warehouse data base which, in the preferred embodiment, is inputted into a memory of the computer system. Selected portions of this information will later be retrieved from the memory, corresponding to the parcels of the group of parcels identified to be palletized. The data which is inputted at step 30 identifies the type, contents and quantity of every different parcel which is available in the warehouse, including the dimensions and weights of each type of parcel. Initializing the computer system also includes determining attribute factors for each type of parcel and orientation thereof.

Attribute factors define and quantify the physical characteristics of the parcel. The attribute factors relate to the physical characteristics that are important in order to select a space in which to stack the particular parcel when palletizing. These attribute factors can include toxicity, drop tests, crushability, fragility and content. Attribute factors are values, related to the physical characteristics, which are assigned based on the evaluation of the parcel type by the person setting up the system. These values may be modified based on performance of the system.

In the present embodiment of the invention, each parcel was assumed to be cubical in shape, having three basic dimensions: height, width and length. The allowable orientation of a parcel depends on some of the attribute factors. For example, a particular parcel may be able to support a given weight on its upper surface when in one orientation. However, if the parcel is rotated into a different orientation onto one of its sides, it may no longer be able to support any weight on its new upper surface. Thus, there may be up to three different vertical orientations available for a single parcel. Each different allowable orientation of a given parcel represents a different parcel type to the system. Each different orientation also has associated with it a complete set of attribute factors, which may vary between different orientations.

Initializing the computer system step 30, also includes assigning initial threshhold levels for use in evaluating the attribute factors in searching for space, which is detailed below. The initial threshhold levels are input into a memory of the computer at step 30.

Threshhold levels relate to the physical characteristics and are represented by a value which are assigned by the person setting up the system. Except for the toxic threshhold level, the threshhold levels relate to particular spaces and levels in the pallet model and are updated during the process of stacking parcels on the pallet. Differences between attribute factors and threshhold levels are evaluated with respect to the constraints and weighing factors used to determine where to place the parcel.

As an alternate to inputting the above-described information at step 30, the same information for the group of parcels to be palletized may be contained in or added to the bill of lading, and inputted at step 31 along with the information described below. Initialization of the system step 30 is anticipated to be done initially after the installation of the system. As the warehouse population changes, such as due to the addition of new parcel types step 30 may be repeated for all or a portion of the parcel types in the warehouse. Step 30 may also be repeated as is necessary based on performance of the system.

Data which identifies the types and quantities of parcels to be palletized is input into the working memory of the computer system at step 31. This information is typically taken from a bill of lading and may be input by keyboard, by scanning or by some other method of entering data. This information defines the quantity and types of parcels to be placed on pallets for a particular run of the system. When all of the parcels contained in the bill of lading have been palletized or disposed of, information from a new bill of lading may be inputted at step 31 and the procedure for stacking pallets repeated.

After the bill of lading has been entered at step 31, the computer system then retrieves the complete information for each type of parcel of the group of parcels to be palletized identified at step 31 from the warehouse data base created during the initialization of the system at step 30. This information is stored in the working memory of the computer in association with the data entered at step 31. Of course, alternatively, this information may have been entered at step 31, eliminating the need to retrieve such information.

With the complete information concerning each type of parcel of the group of parcels to be palletized and the pallet size, the system determines a size for a volume element, known as a voxel, which is used to model mathematically each parcel (including all orientations) of the group of parcels to be palletized, and the pallet space. A voxel has three dimensions, X, Y, Z, with each dimension being independent of the other two dimensions. A voxel has sides of unit length, $1 \times 1 \times 1$. Each unit length dimension of a voxel may represent a different actual length. For example a $1 \times 1 \times 1$ box may represent a volume element having actual dimensions of $3'' \times 2'' \times 1''$.

Preferably all parcels and the pallet space are modeled as being exactly and completely composed of whole voxels. Mathematically, however, only a voxel size which has dimensions that divide evenly (i.e. integer quotients) into the corresponding dimensions (i.e. the X, Y and Z directions) of all parcels of the group of parcels to be palletized and the pallet space will accomplish this result. Such a voxel is termed a common voxel. If all parcels and the pallet space are measured to the nearest thousandth of an inch, then a voxel having dimensions of $0001'' \times 0.001'' \times 0.001''$ will be a common voxel. However, using a common voxel of such a small size would mean, for example, that a $9'' \times 15'' \times 12''$ parcel would be modeled as being 9,000 voxels $\times$ 15,000 voxels $\times$ 12,000 voxels, which would be too computational intensive even for many of today's super computers.

By determining the largest dimension for each direction which is common to the corresponding dimensions for all of the parcels, the group of parcels to be palletized and for the pallet space, the largest common voxel may be determined. For example, the largest common voxel in the above-example may have dimensions of $0.250'' \times 0.100'' \times 0.125''$, yielding a mathematical model of 6 voxels $\times$ 150 voxels $\times$ 96 voxels for a $9'' \times 15'' \times 12''$ parcel. Although using the largest common voxel should reduce the number of voxels necessary to model any parcel or pallet space, the largest common voxel size may still be too small and computational intensive to provide a quick response time by the computer.

With adequate computer speed and memory, the largest common voxel is desireable because all spaces are exactly and completly modeled as whole voxels. However, because the largest common voxel size is based on the makeup of the group of parcels to be palletized, the size of the largest common voxel will varying with each bill of lading. For example, one bill of lading may have a largest common voxel size of $0.250'' \times 0.100'' \times 0.125''$, while another bill of lading may have a largest common voxel size of $0.001'' \times 0.001'' \times 0.001''$. The range of possible sizes for the largest common voxel will include sizes which are beyond the capacity of the computer system. The expense of a computer system, if available at all, which could handle the entire range is prohibitive.

The preferred embodiment of the present invention utilizes the heuristic approach in selecting a voxel size which compromises accuracy (in terms of exactly and completely modeling the parcel and pallet spaces) for performance (based on speed). At step 32, the system determines a "logical" voxel size. Different "proposed" voxel sizes are selected for analysis based on the pallet size. The dimensions of a selected proposed voxel size are compared to the corresponding dimensions of each parcel (and orientations thereof) by dividing the voxel dimensions into the corresponding parcel dimensions, yielding a corresponding parcel dimension expressed as voxels. The voxel dimensions of a parcel may not be in integer numbers, in which case the voxel dimension of the parcel is rounded up to the next highest integer (rounding up allows some tolerance and play to accommodate positional errors and slight shifting of the stacked parcels.) This integer represents the estimated parcel size of the new voxel.

To evaluate each proposed voxel size, the error between the estimated parcel and the actual parcel size is calculated for each parcel and then summed to give the total error for the group of parcels to be palletized. For a particular parcel, the total parcel error is obtained by calculating the total difference between the actual voxel dimensions and the corresponding rounded or estimated integer voxel dimensions, and multiplying that difference by the corresponding physical dimension of the proposed voxel size. The result is then multiplied by the total number of parcels of that type to yield the total parcel error. This proceedure is repeated for each parcel type and the respective total parcel errors are summed to yield the total error of the proposed voxel size.

Each proposed voxel size is evaluated and the total error is compared. The lowest total error is presummed to yield the least wasted space. A logical voxel size is then selected by the computer system based on an assessment of total errors versus the estimated computational time of each proposed voxel size.

Figures 5B, 6:
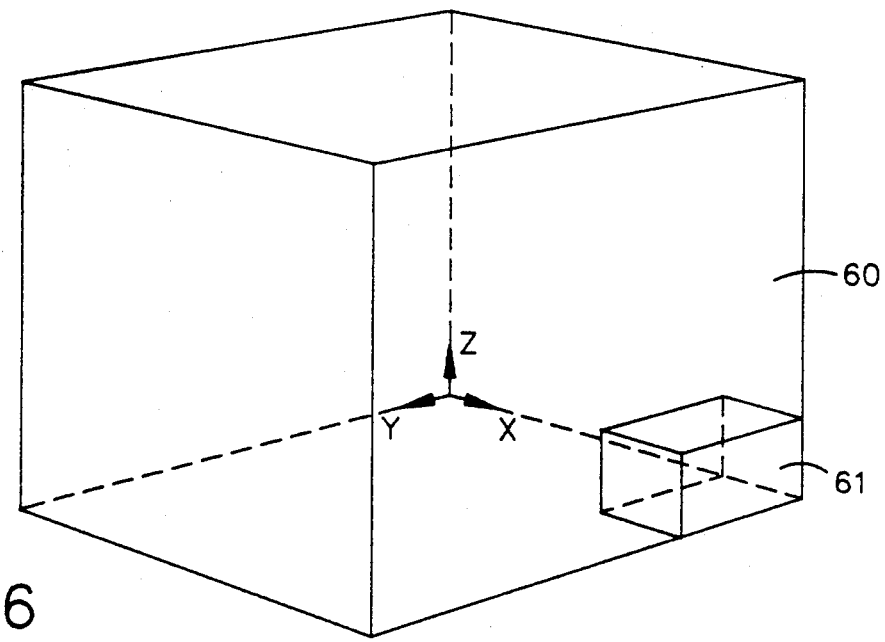
FIG. 6 shows a representation of the pallet space and a voxel location within the space.

FIGS. 4a and 5a show a sample analysis of a proposed voxel size of $3'' \times 3'' \times 1''$ for the indicated group of parcels to be palletized. FIG. 4a shows the calculation of the actual voxel dimensions of the parcel and the rounding up to give the estimated parcel size in integer voxels. FIG. 5a shows the determination of the total parcel error and the total error for the proposed voxel size. FIGS. 4b and 5b show a corresponding sample analysis for a proposed voxel size of $4'' \times 4'' \times 1''$. In the example shown, the increase in computational speed by using a voxel size of $4'' \times 4'' \times 1''$ rather than a voxel size of $3'' \times 3'' \times 1''$ was determined to out weigh the 6% increase in total volume error resulting from the use of a voxel size of $4'' \times 4'' \times 1''$ rather than a voxel size of $3'' \times 3'' \times 1''$.

In the preferred embodiment of the present invention, the vertical dimension of the logical voxel is assigned the length of 1" and is not considered in determining the size of the logical voxel. This allows improved performance in the computational time required for the system to operate. It also has a minimal affect on the resulting pallet. As would be clear to one skilled in the art, however, a different dimension could be assigned to the vertical dimension of a logical voxel, as well as to either or both horizontal dimensions, based on computational speeds of the computer system.

Figure 7:
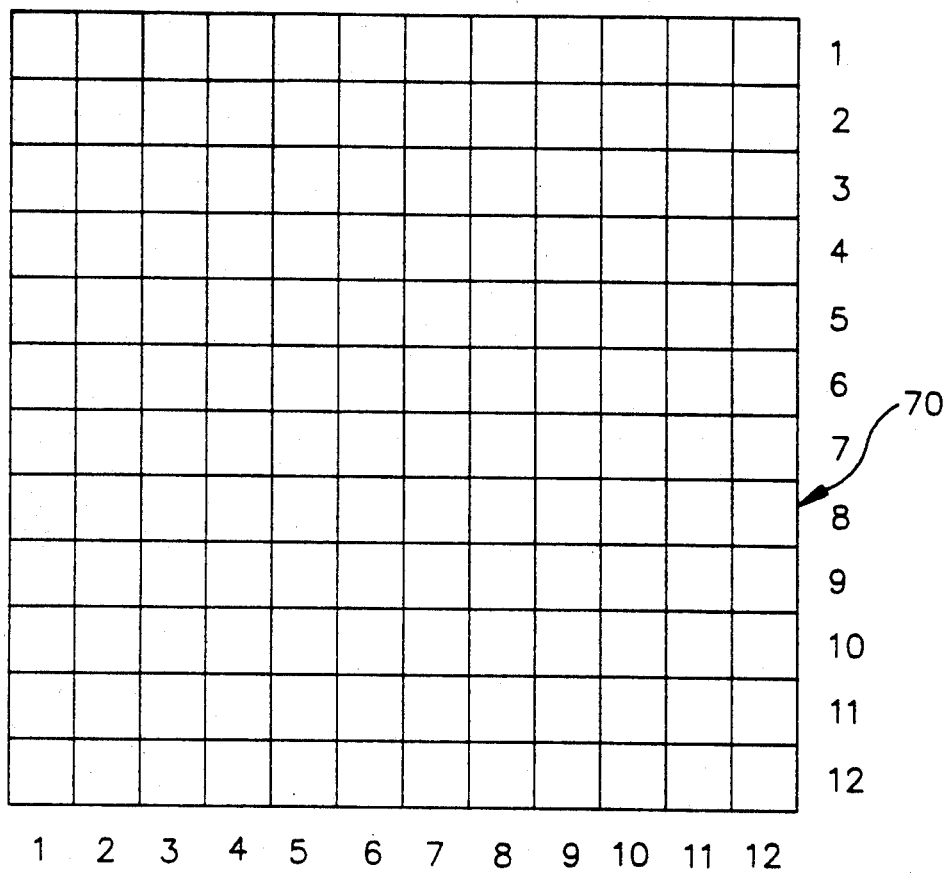
FIG. 7 is a plan view of the pallet space, divided into voxels.

A mathematical pallet model is created based on the logical voxel and stored in the working memory of the computer system at step 33. As shown in FIG. 6, the pallet space 60 is comprised of individual voxels 61 which are equivalent to the logical voxel. FIG. 7 shows a plan view of pallet space 70 having been modeled into a 12 voxel by 12 voxel model. If the pallet size were 48" by 48", according to the pallet model in FIG. 7, the voxel size would be 4"×4"×1". If, for another example, the pallet size, were 48" by 36", the voxel size, according to the pallet model in FIG. 7, would be 4"×3"×1". The voxels occupy the total space. Each voxel size and location in the pallet model is stored in the working memory of the computer system.

Referring again to FIG. 3, set relationships between various parcel types are determined at step 34. A set relationship exists whenever a first group of a particular quantity and orientation of at least one parcel type, when stacked together, forms a flat surface which has x and y dimensions, measured in voxels, that are approximately equal to the x and y dimensions, respectively, measured in voxels, of a second flat surface which is formed when a second group of a particular quantity and orientation of at least one parcel type is stacked together. Thus by this definition, a set may consist of one or more different parcel types. In order to form a set relationship, each of the parcel types of the second group must be stackable on top of the first group based on the contents of the parcel types of the second group.

Figure 8:
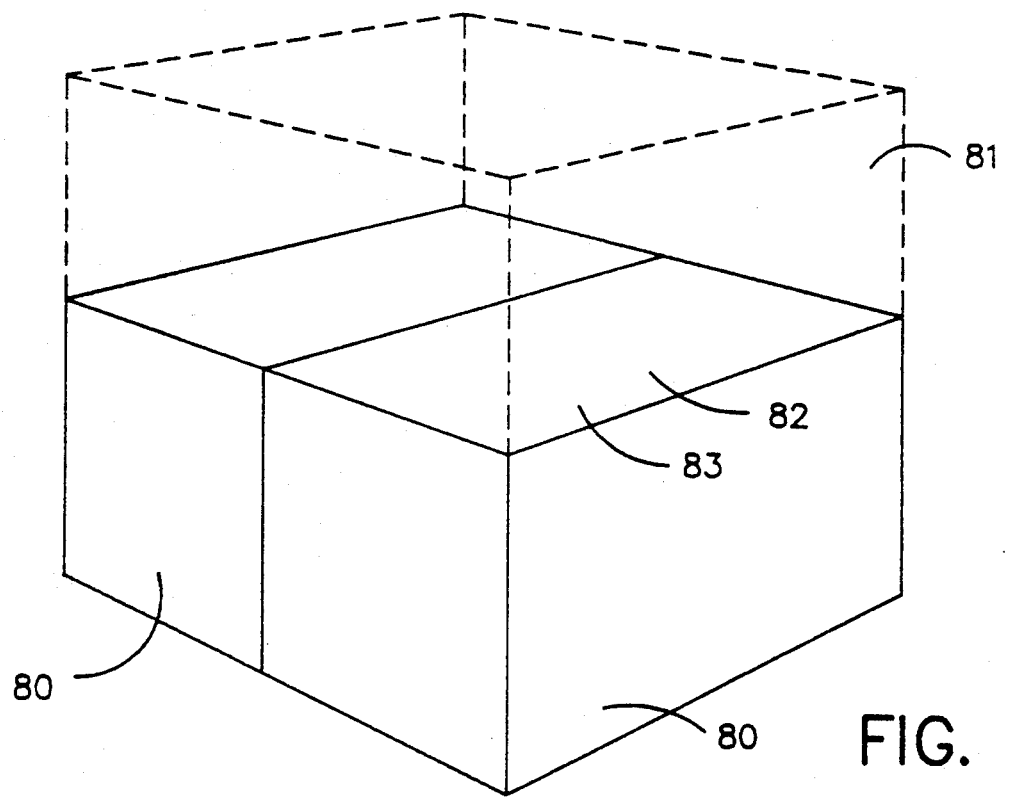
FIG. 8 shows an example of a set relationship between parcel types.

FIG. 8 shows parcel type 80 in a set relationship with parcel type 81. Parcel type 80, when stacked two parcels by one parcel, forms a flat, top horizontal surface 82. Parcel 81, alone, forms a flat, bottom horizontal surface 83. As shown in FIG. 8, the x voxel dimensions for surfaces 82 and 83, and the y voxel dimensions for surfaces 82 and 83 are equal. Therefore, as shown in FIG. 8, one parcel of type 81 may be stacked on top of two parcels of type 80, forming a set relationship.

Parcels 80 occupy the lower level of the set, identified as the first set level. Parcel 81 occupies the upper level of the set, known as the second set level. In addition to the dimensional constraints for forming a set, other attribute factors, as will be discussed later, are examined at step 34 to determine whether a set can be formed. For example, in order for parcel type 81 to be stackable on top of parcel type 80, it must be determined that the quantity of parcel type 80 can support the weight of the quantity of parcel type 81.

All possible combinations and orientations of parcel types are examined at step 34. A set relationship is defined whenever the second group of at least one parcel type can be stacked on top of the first group of at least one parcel type, and equivalent flat surfaces are formed by the combination of an available quantity and an acceptable orientation of all parcel types within each group. When a set relationship has been defined, the definition is stored as an array in a memory of the computer system.

In conjunction with step 34, the attribute factors as identified above of each parcel type are examined to determine whether a set can be formed. One of these attribute factors so examined is that related to toxicity.

In FIG. 3, at step 35, this examination is illustrated as following step 34, although the two steps may merge. During step 34, when the toxicity attribute is examined, if the toxicity attribute factor is determined to be greater than a predetermined toxic threshhold level, space is reserved in the palletized model for the particular parcel on the lowest level of the pallet model. Thus, high priority space is reserved for such toxic parcels in the first level of the empty pallet model. This reserved space is held until the identified toxic parcels arrive at the pickup point and are stacked on the pallet, subject to the space search limitations described below. It should be noted, however, that, based on the search criteria, the reserved space may be reassigned if the toxic parcel has not arrived in a timely fashion.

Figure 9:
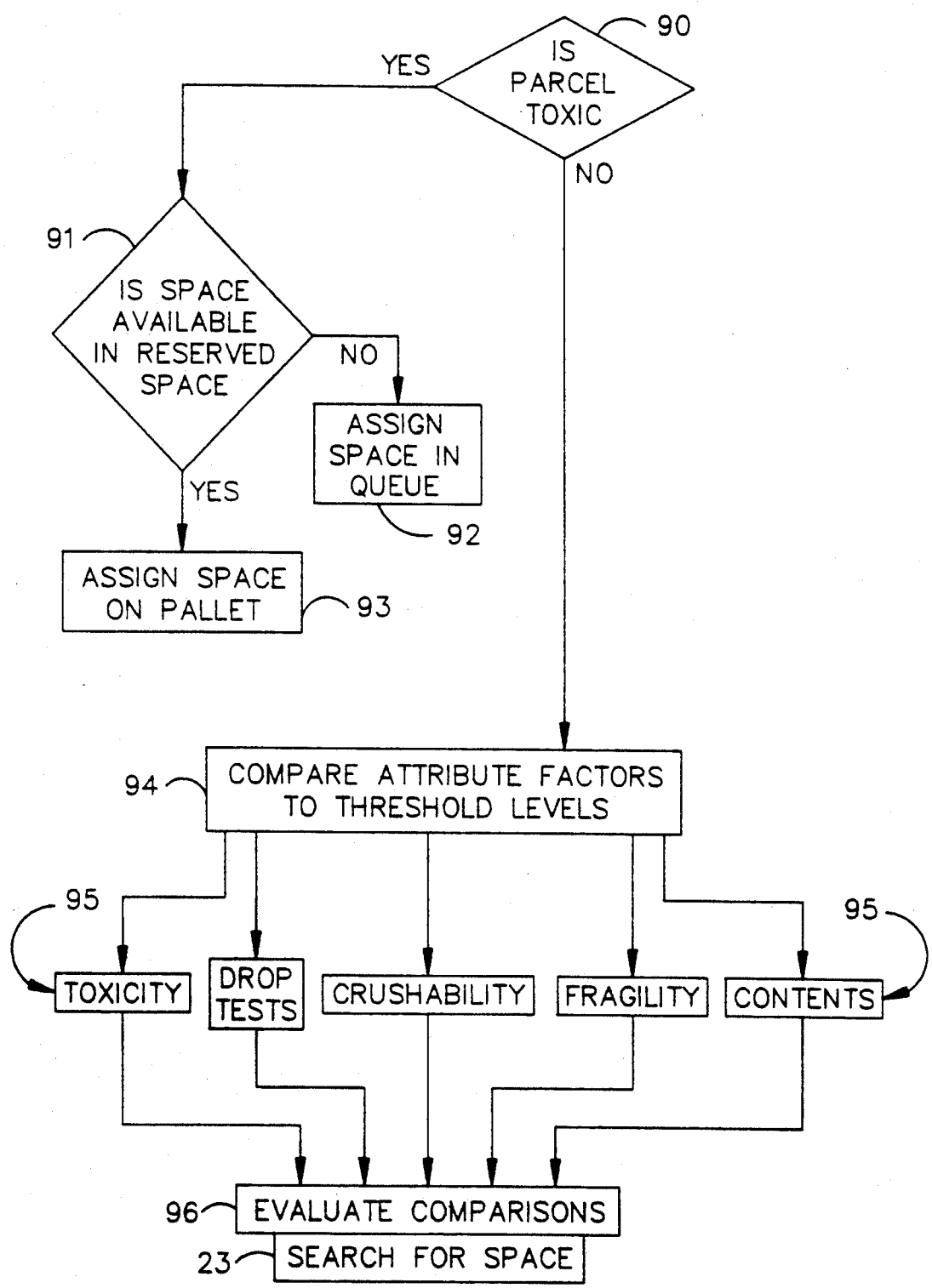
FIG. 9 is a flow diagram which shows the steps of evaluating attribute factors of the parcel to be stacked.

FIG. 9 outlines the steps of evaluating the attribute factors at step 22 of the particular parcel being presented to be stacked (parcel to be stacked) in comparison to the threshhold levels of the pallet model. At step 90, the determination is made whether the parcel to be stacked is a toxic parcel. As discussed above, a toxic parcel is one whose attribute factor for toxicity is greater than the toxic threshhold level. The toxic threshhold level is a predetermined number which is assigned during the initialization of the system at step 30. In contrast, each space in the pallet model has a toxicity threshhold level associated with it, which is based on the attribute factors of the parcels which lie below that space. The toxicity threshhold levels of the unfilled spaces of the pallet model are updated after a parcel is stacked on the pallet. Thus, even if a parcel's attribute factor for toxicity is greater than the toxicity threshhold level for a particular space that parcel is not a toxic parcel, it merely exceeds the toxicity threshold level of that space. Comparisons of attribute factors are conducted and evaluated at steps 94, 95 and 96, described below.

Returning to step 90, the determination is made whether the parcel is a toxic parcel. If the parcel is toxic, then a determination is made at step 91 whether space for this toxic parcel is still available in the space previously reserved in the pallet model for toxic parcels. This reserved space for toxic parcels was created at step 35 above. If space is available for the toxic parcel, then space is assigned at step 93 on the pallet. If space is not available at step 91 of the toxic parcel, then space is assigned in the queue at step 92. This queue may in fact be a queue for toxic parcels only, which is separate from the queue for all other parcels.

If at step 90, the determination is made that the parcel is not a toxic parcel, then a comparison is made at step 94 of the attribute factors of the parcel to be stacked to the threshhold levels of available space. Level 95 in FIG. 9 indicates generally some of the attribute factors which are examined. As shown, these include toxicity, drop tests, crushability, fragility and contents. At step 96, the comparison of these attribute factors is evaluated in relation to specifically available spaces. This evaluation is closely associated with the step 23 search for space. During steps 96 and 23, a total score is calculated for each available space for the parcel to be stacked, based on a weighted comparison of the attribute factors and the rule constraints, as contained in the appended computer program.

Figure 10:
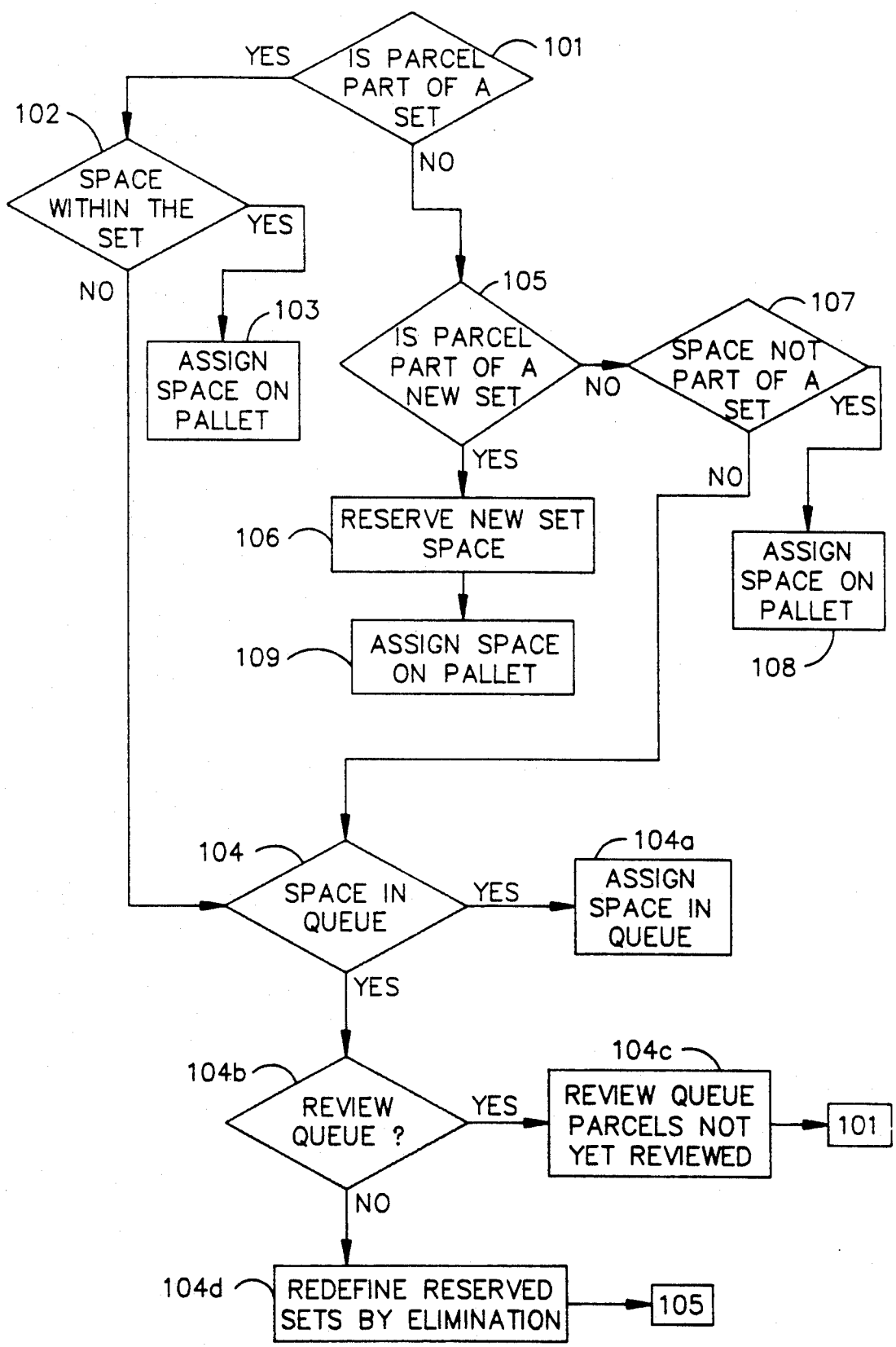
FIG. 10 is a flow diagram which shows the logic analysis used to search for available space.

In conjunction with evaluating the attribute factors at step 22, the pallet model is searched for available space in which to stack the parcel to be stacked, as indicated at step 23 in FIG. 2. FIG. 10 is a flow chart identifying the analysis used to search the pallet model for available space. At step 101, the determination is made whether the parcel to be stacked is part of a set which has a set space reserved in the pallet model. If it is determined to be part of a set having reserved space in the pallet model, then a determination is made at step 102, which is described below, whether there is space within the set space on the pallet for the parcel to be stacked. If space is found to be available at step 102, then space is assigned at step 103 on the pallet for the parcel to be stacked. If space is not available at step 102, then the queue review occurs at step 104, which is described below.

If the parcel to be stacked is determined at step 101 not to be part of any sets reserved in the pallet model, then a determination is made at step 105 whether the parcel to be stacked is part of a new set which can now be reserved in the pallet model. If the parcel to be stacked is part of a new set which can be reserved, then a new set is reserved at step 106 in the pallet model, and space is assigned at step 109 on the pallet for the parcel to be stacked. If at step 105 the parcel is not part of a set which can be reserved in the pallet model, then a determination is made at step 107 whether space is available in the pallet model for the parcel to be stacked not as part of a set. If space is available, then space is assigned at step 108 for the parcel to be stacked If space is not available at step 107, then the queue review occurs at step 104.

The queue review begins at step 104, where it is determined whether space is available for an additional parcel in the queue. In the preferred embodiment of the present invention, the queue is allowed to hold up to five parcels. If space is available in the queue, then at step 104a the parcel to be stacked is assigned space in the queue. If space is not available in the queue, then a determination is made as to when the last time the parcels in the queue were reviewed. If more than a predetermined number of parcels have been reviewed at the pickup point since the last review of all the parcels in the queue, as indicated at step 104b, then a review of the parcels in the queue is undertaken at step 104c. In this instance, the parcel in the queue which has been there the longest without having been reviewed is identified and the analysis beginning at step 101 is applied. If space in the pallet model is not found for that particular parcel in the quene, the procedure is repeated until all the parcels in the queue have been currently reviewed. If all the parcels in the queue have been reviewed within the constraints of step 104b, and no space is available within the pallet model, then reserved sets in the pallet model are eliminated at step 104d one set at a time until one of the parcels in the queue or at the pickup point are part of a set which can be reserved in the pallet model at step 105./ If none of the parcels in the queue and the parcel to be stacked are not part of a set which can be reserved, then space for one of these parcels is sequentially examined at step 107.

Figure 11:
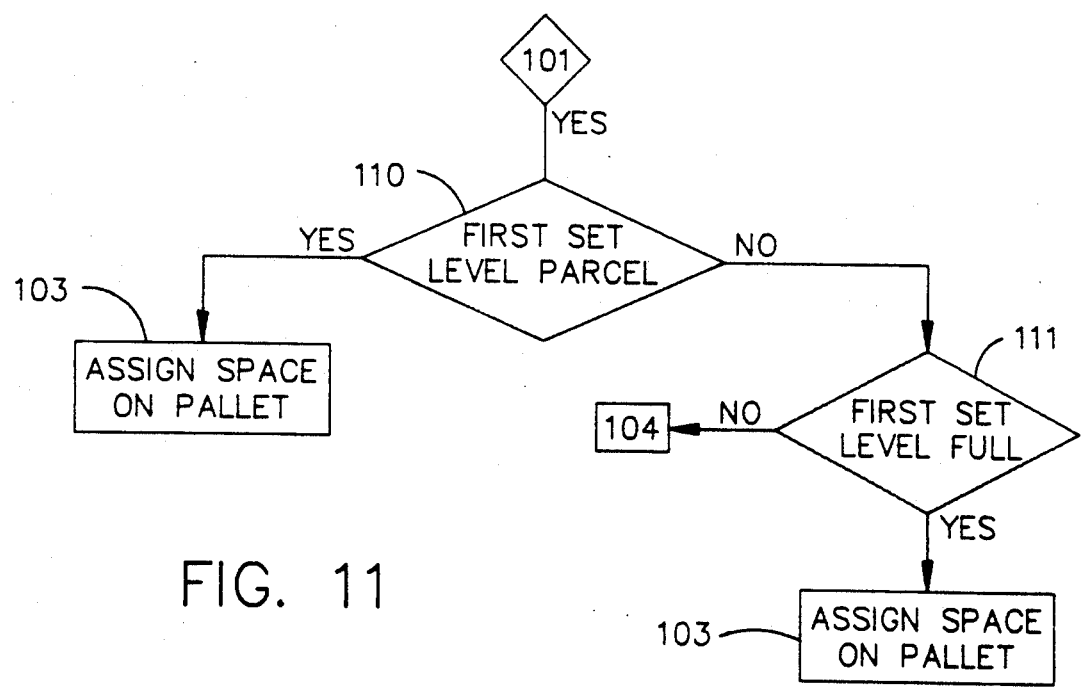
FIG. 11 is a flow diagram which shows the logic analysis used to determine if space is available within a set.

FIG. 11 details the logic used at step 102. Referring briefly to FIG. 8, the lower level of a set relationship is the first set level. The upper level of a set relationship is the second set level. In order to stack a second set level parcel within a set, the first set level must be full. At step 101, a parcel is not considered to be part of a reserved set if the fist set level of that reserved set does not have space available for the parcel (i.e. the set is not already reserved).

At step 110, the determination is made whether the parcel is a first set level parcel. If it is, then the parcel is assigned space at step 103 on the pallet. If the parcel to be stacked is not a first set level parcel at step 110, then the determination is made at step 111 whether the first set level is full in the pallet model. Because the first set level must be full in order to stack a second set level parcel, if the first set level is not full at step 111, then the queue review occurs at step 104. If the first set level is full at step 111, then the second set level parcel may be stacked in the set and space is assigned at step 103 on the pallet.

Figure 12:
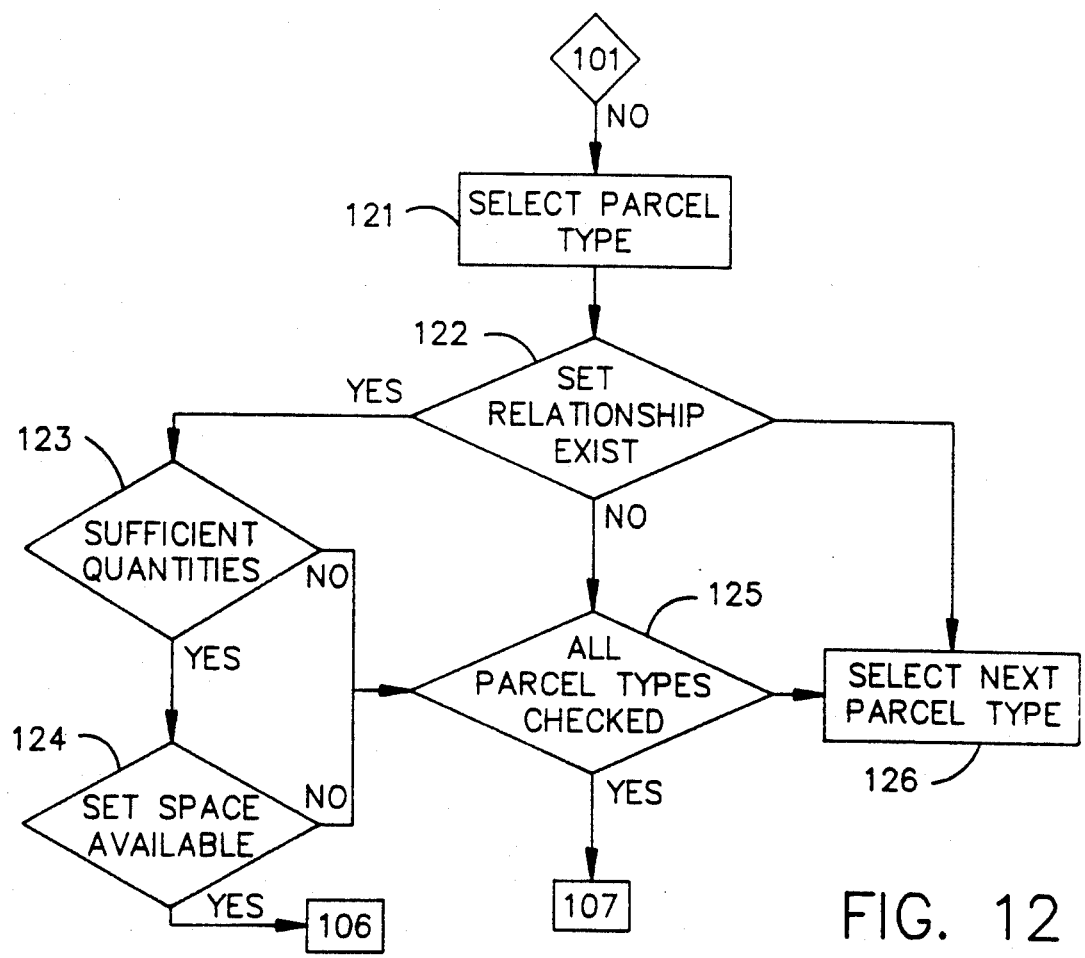
FIG. 12 is a flow diagram which details the logic analysis used to determine if space for a new set is available.

FIG. 12 details the logic analysis applied at step 105 to determine if space for a new set can be reserved in the pallet model. First, the initial parcel type which has the highest number of parcels yet to be stacked on the pallet is selected at step 121. At step 122, a determination is made whether the parcel to be stacked is in a set relationship with at least the selected parcel type and is a first set level parcel of that set. If a set relationship exists and the parcel to be stacked is a first set level parcel, then a determination is made at step 123 whether there are sufficient quantities of the parcel types to form the set identified at step 122. If sufficient quantities exist, then at step 124 the pallet model is analyzed to determine if there is a set space available for the set identified at 122. If there is set space available, set space is reserved in the pallet model at step 106. If the determination made at steps 122, 123 or 124 results in a negative answer, then step 125 is taken. At step 125, a determination is made whether all parcel types left to be stacked have been checked. If all such parcel types have been checked, resulting in no new set space being reserved in the pallet model, then the analysis returns to step 107, shown at FIG. 10, to determine if space is available for the individual parcel. If all parcel types have not been checked, then step 126 is taken, at which a new parcel type is selected for analysis which has the next highest number of parcels to be stacked on the pallet. The system then returns to step 122 to evaluate the newly selected parcel type.

After the pallet model has been searched for space to assign to the parcel to be stacked, space is then assigned to the parcel based on the results of the above steps. As indicated in FIG. 10, if space is not available in the pallet model for the parcel to be stacked, then the queue review begins. If space is available in the queue, then space is assigned in the queue for the particular parcel at step 104. If space is identified for the parcel in the pallet model, then space on the pallet is assigned to the parcel as indicated at steps 103, 108, and 109.

The pallet stacking rules contained in the computer program include predetermined criteria defined to ensure that the pallet being stacked results in an acceptable construction based on the heuristic approach standard. These criteria represent constraints on the assignment of space on the pallet for a parcel to be stacked.

One example of such a constraint is the center of mass constraint. The center of mass of the pallet is analyzed by dividing the model into four quadrants when viewed from above. The locations of the centers of mass of each quadrant is calculated based on the weights of the parcels stacked in the quadrant. Whenever more than one space is available for a parcel to be stacked, new locations of the centers of mass of each of the quadrants which contain the available spaces are calculated as if the parcel to be stacked were actually in the space of the particular quadrant. If only one of the newly calculated centers of mass is within a predetermined distance limit from the geometric center of the particular quadrant, then the parcel to be stacked will be assigned the space in that particular quadrant. If none of the newly calculated centers of mass are within the predetermined limit from the geometric center of the respective quadrant, then the assignment of space may be made independent of the impact on the center of mass of the pallet. However, if two or more of the newly calculated centers of mass are within the predetermined limit from the geometric center of the respective quadrant, then only these spaces will be considered for assignment to the parcel to be stacked.

Another constraint on the assignment of a space to a parcel is a directionality constraint. This constraint dictates that the number of fracture lines, or lines where the edges of parcels align vertically, should be minimized. To do this, priority is given to spaces which result in maximizing the interlocking and intermeshing of parcel edges. Preferably the parcels, as they are stacked, are placed in a manner similar to stacking interlocking bricks.

There is also a filling constraint which applies preference to filling the lowest open layer of the pallet prior to filling higher layers. This constraint also indicates a preference for locations which will avoid interfering with the stacking of subsequent parcels. Another constraint ensures that the parcels do not overhang the edge of the pallet volume by an unacceptable amount.

Tolerances are built into the stacking of the parcels in order to accommodate errors in the assignment of a voxel size, as well as errors in shapes and sizes of parcels and due to shifting during the placement of the parcel on the pallet. As the errors accumulate, space may or may not be available for a parcel depending on whether the parcel overhangs the edge of the pallet volume. Examination of the edges may be done based solely on the mathematical pallet model contained within the working memory of the computer, or may also be enhanced by the vision system 11 shown in FIG. 1.

These constraints are applied to determine whether a parcel to be stacked may be assigned a space which has been found. Additionally, however, there will be instances where more than one space has been identified for a particular parcel. In these instances, a weighted score is assigned to each space available for the parcel based on the evaluation of the attribute factors in comparison to the threshold levels and based on the pallet construction constraints. The weighing factors for each attribute and constraints are based on observation of experts in the process of palletizing. These weighing factors were translated into the mathematical relationships inherent in the computer program microfiche appendix. The space which has the highest weighted score is the space which will be assigned to the parcel to be stacked.

When space has been assigned to the parcel to be stacked, the necessary information is communicated to the robot controller 7 in FIG. 1. This transfer of information as indicated at step 24 in FIG. 2 includes whatever information is necessary to enable the robot to pick up the parcel from the pickup point and transfer it to the assigned space. This information may include the coordinates of the parcel to be stacked, the dimensions and weight of the parcel to be stacked, and the coordinates of the assigned space including any error tolerancing adjustments. This interface between the computer system and the robot controller, as well as the programming necessary to translate and interpret the coordinates in order to stack the parcel, are commercially available and are well known in the field. The robot then stacks the parcel in the assigned space.

As indicated at step 25 in FIG. 2, the working memory of the computer system is updated. This includes updating the pallet model to indicate if a parcel has been stacked in an assigned space on the pallet. If the assigned space was in the queue, then the working memory of the computer is updated to indicate the location of the parcel in the queue. Furthermore, based on the current condition of the pallet, the threshold levels are updated based on the space still available in the pallet model and based on the types and location of parcels currently stacked on the pallet.

In summary, numerous benefits have been described which result from employing the concepts of the present invention. The method and apparatus described above provide a real time system which can reliably and economically stack parcels on a pallet in a repeatable, acceptable manner.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for using a computer system to effect the palletizing of parcels, comprising the steps of:
    (a) providing a group of parcels to be palletized, each parcel of said group of parcels having previously determined attribute factors;
    (b) inputting data which identifies the type sand quantities of the parcels which comprise said group of parcels to be palletized into a memory of the computer system;
    (c) determining dimensions of a logical voxel based on at least one of the orthogonal dimensions of each parcel of a plurality of said group of parcels;
    (d) determining the total pallet space available;
    (e) creating a mathematical pallet model representative of the total pallet space available by dividing mathematically the total pallet space available into a plurality of voxels, each of said voxels being dimensionally equal to corresponding dimensions of said logical voxel;
    (f) storing said pallet model in a memory of the computer system;
    (g) identifying from said group of parcels to be palletized a specific parcel to be stacked;
    (h) evaluating the attribute factors of said specific parcel to be stacked in comparison to predetermined threshold levels of the pallet models;
    (i) searching at least a portion of said pallet model for at least one space comprising a combination of voxels which are adjacent to each other, said combination of voxels mathematically corresponding to the size of said specific parcel to be stacked, said combination of voxels representing actual space in said pallet space in which said specific parcel to be stacked can be physically located;

(j) assigning space in accordance with predetermined rules to said specific parcel to be stacked when at least one space is found in step (i) for said specific parcel to be stacked; and (k) locating said specific parcel to be stacked in the actual space corresponding to said space assigned in step (j) to said specific parcel to be stacked.

2. The method according to claim 1 comprising the step of determining and identifying the existance of set relationships between the types of parcels comprising the group of parcels to be palletized.

3. The method according to claim 2 wherein the step of determining and identifying the set relationship comprises:

(a) selecting from the group of parcels to be palletized, a first group consisting of at least one parcel type and a second group consisting of at least one parcel type;

(b) determining whether said second group can be located above said first group, said determination being based at least in part on the contents of each of said parcel types of said first group and on the contents of each of said parcel types of said second group;

(c) determining the existence of a first combination of an available quantity and acceptable orientation of said at least one parcel type of said first group which forms a first flat surface whose horizontal dimensions are equivalent to the horizontal dimensions of a second flat surface that can be formed by a second combination of an available quantity and acceptable orientation of said at least one parcel type of said second group;

(d) defining a set relationship between said at least one parcel type of said first group and said at least one parcel type of said second group, whenever said at least one parcel type of said second group can be located above said first group and said first and second combinations exist and;

(e) storing the definition of said set relationship in a memory of the computer system.

4. The method according to claim 2 comprising the steps of:

(a) determining whether any parcel types of the parcels to be palletized are toxic; and (b) reserving space in said pallet model for toxic parcels, whenever any parcel types have been determined to be toxic.

5. The method according to claim 1 wherein the step of assigning space to the parcel to be stacked comprises:

(a) assigning space to said specific parcel to be stacked on the pallet when space is found in the parcel model in accordance with predetermined rules which corresponds to the physical size of said specific parcel to be stacked; and (b) assigning space to said pacific parcel to be stacked in a queue when space is not found in the pallet model in accordance with predetermined rules which corresponds to the physical size of said specific parcel to be stacked.

6. The method according to claim 1 wherein the step of searching the pallet model comprises:

(a) determining if said specific parcel to be stacked is part of a set which has a set space reserved in the pallet model; and (b) determining if space within a reserved set space exists in the pallet model corresponding to the physical size of said specific parcel to be stacked, whenever it has been determined that said specific parcel to be stacked is part of a set which has a set space reserved in the pallet model.

7. The method according to claim 6 wherein said set space comprises first and second set levels, and wherein the step of determining if space within a reserved set exists comprises:

(a) determining whether said specific parcel to be stacked is a first set level or a second set level parcel type;

(b) determining whether space is available in the pallet model within the first set level of the reserved set which corresponds to the physical size of said specific parcel to be stacked whenever said specific parcel to be stacked is a first set level parcel type; and (c) determining whether space is available in the pallet model within the second set level of the reserved set which corresponds to the physical size of said specific pallet to be stacked whenever said specific pallet to be stacked is a second set level parcel type and said first set level is full.

8. The method according to claim 6 wherein the step of searching the pallet model comprises:

(a) determining whether said specific parcel to be stacked is part of a new set for which a new set space can be reserved in the pallet model, whenever said specific parcel to be stacked is not part of a set for which a set space has already been reserved in the pallet model; and (b) reserving a new set space in the pallet model, whenever said new set space can be reserved and said specific parcel to be stacked is not part of a set for which a set space has already been reserved in the pallet model.

9. The method according to claim 8 wherein the step of determining whether the parcel to be stacked is part of a new set for which a new set space can be reserved comprises determining which parcel type of the group of parcels to be palletized (i) has the greatest number of parcels left to be stacked and (ii) is in a set relationship with at least the parcel to be stacked, for which said new set space for said new set exists in the pallet model and for which said parcel to be stacked is a first set level parcel of said new set.

10. The method according to claim wherein the step of searching the pallet model comprises determining whether space exists in the pallet model which corresponds to the physical size of said specific parcel to be stacked whenever said specific parcel is not part of a set for which a set space has been reserved and said specific parcel to be stacked is not part of a new set for which a set space can be reserved.

11. The method according to claim 10 wherein the step of assigning space to the specific parcel to be stacked comprises:

(a) assigning space to said specific, parcel to be stacked on the pallet when space is found in the parcel model in accordance with predetermined rules which corresponds to the physical size of said specific parcel to be stacked; and (b) assigning space to said specific parcel, to be stacked in a queue when space is not found in the pallet model in accordance with predetermined rules which corresponds to the physical size of said specific parcel to be stacked.

12. The method according to claim 11 wherein the step of searching the pallet model comprises redefining at least one set space of any set spaces reserved in the pallet model, whenever the number of parcels to be stacked which are in the queue exceeds a predetermined number, such that space can be identified in the pallet model in accordance with predetermined rules which corresponds to the physical size of at least one of the parcels in the queue or to the physical size of said specific parcel to be stacked.

13. The method according to claim 11 wherein the step of searching the pallet model comprises reviewing the parcels in the queue after a predetermined quantity of parcels to be stacked have been identified, evaluated, and assigned space, since the last review of the queue.

14. The method according to claim 1 comprising the step of updating the computer system.

15. The method according to claim 14 wherein the step of updating the computer system comprises:
    (a) updating the pallet model to indicate what actual space is occupied by the parcels stacked on the pallet;
    (b) updating a queue file to indicate what parcels are in a queue; and
    (c) updating the threshhold levels based on the space available in the pallet model and based on the types and locations of parcels currently stacked on the pallet.

16. The method according to claim 1 wherein the step of searching the pallet model comprises applying predetermined pallet stacking rules to determine whether said specific parcel to be stacked can be located in an identified space.

17. The method according to claim 16 wherein the step of applying predetermined pallet stacking rules comprises determining whether the center of mass of the pallet would be within predetermined limits if said specific parcel to be stacked were to be located in an identified location.

18. The method according to claim 16 wherein applying predetermined pallet stacking rules comprises determining whether the pallet will meet predetermined interlocking volume criteria if said specific parcel to be stacked were to be located in an identified location.

19. The method according to claim 16 wherein applying predetermined pallet stacking rules comprises determining whether the pallet will meet predetermined pallet edge criteria if said specific parcel to be stacked were to be located in an identified location.

20. The method according to claim 1 comprising the step of initializing the computer system.

21. The method according to claim 20 wherein the step of initializing the computer system comprises:
    (a) identifying the types of parcels available to be palletized;
    (b) assigning attribute factors to each of said parcel types;
    (c) assigning initial threshhold levels; and
    (d) inputting into a memory of the computer (i) data which identifies said parcel types; (ii) said attribute factors; and (iii) said threshold levels.

22. The method according to claim 1 wherein the step of determining dimensions of a logical voxel comprises:
    (a) selecting at least one proposed voxel size based on the total pallet space;
    (b) determining an estimated parcel size based on each proposed voxel size for each parcel of a plurality of parcels of said group of parcels;
    (c) determining the difference between each estimated partial size and the respective actual parcel size, and summing said differences separately to yield a total difference for each proposed voxel size;
    (d) estimating the required computational time for each proposed voxel size; and
    (e) selecting a logical voxel from said at least one proposed voxel size based on an assessment of each said total difference and respective estimated computational time.

23. The method according to claim 1 wherein the step of determining dimensions of a logical voxel comprises the step of setting the dimensions of said logical voxel to be equal to the dimensions of a largest voxel common to a plurality of parcels of said group of parcels based on at least one of the orthogonal dimensions of each parcel of said plurality of parcels.

24. An apparatus for palletizing parcels, comprising:
    (a) means for transporting a plurality of parcels to a predetermined pick up point;
    (b) means for determining the types and quantity of parcels to be palletized;
    (c) means for receiving information carried by individual parcels transported by said transporting means;
    (d) means for determining dimensions of a logical voxel;
    (e) means for creating a pallet model representative of the pallet space by mathematically dividing the pallet space available into voxels equal to in size to said logical voxel;
    (f) mean for evaluating attribute factors of an individual parcel transported by said transporting means in comparison to predetermined threshold levels of said pallet model;
    (g) means for assigning space to said individual parcel in accordance with the information carried by said individual parcel, with the evaluation of the attribute factors of said individual parcel and with predetermined rules; and
    (h) means for transferring said individual parcel from said pick up point to said assigned space.

25. The apparatus as claimed in claim 29 wherein said transferring means comprises a robot system configured to receive coordinate information related to said assigned space and to the location of said individual parcel.

26. The apparatus as claimed in claim 24 wherein said pallet model creating means, said attribute factor evaluating means and said space assigning means further comprise a preprogrammed digital computer.

* * * * *

UNITED STATES PATENT AND TRADEMARK OFFICE
CERTIFICATE OF CORRECTION

PATENT NO. : 5,175,692

DATED : December 29, 1992

INVENTOR(S) : Abdel-Kadar Mazouz, Gale D. Slutzky, Ernest L. Hall, Richard L. Shell, Ronald L. Huston It is certified that error appears in the above—identified patent and that said Letters Patent is hereby corrected as shown below:

Column 14:
Claim 1, line 6, "type sand" should read --types and--.

Claim 1, line 26, "models" should read --model--.

Column 15:
Claim 3, line 25, "group." should read --group--.

Claim 3, line 28 "exist and;" should read --exist; and--.

Column 16:
Claim 7, line 17, "pallet" should read --parcel--.

Claim 7, line 18, "pallet" should read --parcel--.

Claim 10, line 1, "claim wherein" should read --claim 8 wherein--.

Claim 11, line 6, "parcel" should read --pallet--.

Claim 11, line 9 "parcel," should read --parcel--.

Column 18:
Claim 22, line 9, "partial" should read -- parcel--.

Claim 24, line 15, "mean"should read --means--.

UNITED STATES PATENT AND TRADEMARK OFFICE
CERTIFICATE OF CORRECTION

PATENT NO. : 5,175,692

DATED : December 29, 1992

INVENTOR(S) : Abdel-Kadar Mazouz, et al.

It is certified that error appears in the above-identified patent and that said Letters Patent is hereby corrected as shown below:

Column 18, claim 25, line 1, "claim 29" should read --claim 24--.

Signed and Sealed this

Thirtieth Day of November, 1993

Attest:

BRUCE LEHMAN

Attesting Officer

Commissioner of Patents and Trademarks